(12) United States Patent
Wang et al.

(10) Patent No.: US 7,020,705 B2
(45) Date of Patent: Mar. 28, 2006

(54) DE-AUTHENTICATING IN SECURITY ENVIRONMENTS ONLY PROVIDING AUTHENTICATION

(75) Inventors: Bing Wang, Portland, OR (US); Jessica Zhang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 632 days.

(21) Appl. No.: 09/843,599

(22) Filed: Apr. 26, 2001

(65) Prior Publication Data

US 2002/0161886 A1    Oct. 31, 2002

(51) Int. Cl.
    *G06F 15/16* (2006.01)
(52) U.S. Cl. ............... 709/229; 709/203; 709/223; 709/224; 715/153; 715/155; 715/201
(58) Field of Classification Search ............ 709/229, 709/203, 223–225, 228; 713/153, 155, 168, 713/201–202
    See application file for complete search history.

(56) References Cited

U.S. PATENT DOCUMENTS

| 5,649,099 | A  | * | 7/1997  | Theimer et al. ............ 713/201 |
| 5,875,296 | A  | * | 2/1999  | Shi et al. ................... 713/202 |
| 5,918,228 | A  | * | 6/1999  | Rich et al. .................... 707/10 |
| 6,154,751 | A  | * | 11/2000 | Ault et al. .................. 707/201 |
| 6,205,480 | B1 | * | 3/2001  | Broadhurst et al. ......... 709/225 |
| 6,226,752 | B1 | * | 5/2001  | Gupta et al. ................ 713/201 |
| 6,339,423 | B1 | * | 1/2002  | Sampson et al. ........... 715/854 |
| 6,374,359 | B1 | * | 4/2002  | Shrader et al. ............. 713/201 |
| 6,601,171 | B1 | * | 7/2003  | Carter et al. ................ 713/175 |
| 6,606,663 | B1 | * | 8/2003  | Liao et al. .................. 709/229 |
| 6,668,322 | B1 | * | 12/2003 | Wood et al. ................ 713/182 |
| 2002/0029269 | A1 | * | 3/2002  | McCarty et al. ............ 709/225 |

* cited by examiner

*Primary Examiner*—Ario Etienne
*Assistant Examiner*—LaShonda Jacobs
(74) *Attorney, Agent, or Firm*—Steven D. Yates

(57) ABSTRACT

In a protocol providing for authentication to a first security realm, but failing to provide for a logout operation to de-authenticate from the first security realm, a logout operation is effected by providing a logout button, hyperlink, or other linking construct that causes a user to be transparently authenticated to a second security realm. For example, with respect to HTTP basic authentication, authentication with the second security realm removes, or logs out, the user from the first security realm.

24 Claims, 4 Drawing Sheets

FIG. 3

```
!/usr/bin/perl5
use CGI qw(:standard);

$url = "http://www.mycompany.com/login.html"
print "Location: $url\n\n";
exit;
```
(300)

DE-AUTHENTICATING IN SECURITY ENVIRONMENTS ONLY PROVIDING AUTHENTICATION

FIELD OF THE INVENTION

The invention generally relates to logoff authentication, and more particularly to de-authentication from access privileges granted by a HyperText Transport Protocol (HTTP) basic authentication.

BACKGROUND

Certain communication protocols only provide a login authentication dialog on accessing a particular resource, and do not provide a logout or de-authentication method to remove authentication. For such protocols, once a user is authenticated, the user remains authenticated. This restricts the ability to allow multiple users to share a common access point utilizing such a limited protocol.

A well-known protocol having this authentication limitation is HTTP. HTTP provides a basic authentication scheme, in which a web page designer may assign user name/password pairs to particular web resources. One typical technique for triggering authentication dialog boxes is through use of the .htaccess and .htpasswd files utilized by Apache web severs (well-known public-domain Web servers). When a user attempts to access a protected resource, such as with a web browser, the htaccess file tells the web server to instruct the user's browser to display an authentication dialog comprising a user name and password field. The user must then supply credentials that match the .htpasswd file. If the user provides proper credentials, the user is then allowed access to the resource.

Unfortunately, HTTP fails to provide a de-authentication ability for a web browser session. That is, one cannot secure a web site with HTTP basic authentication, and then let multiple users access the site with a single web browser running on a public terminal. This configuration fails because, under basic HTTP authentication, once a first user is authenticated, then the browser session remains authenticated until the web browser session, e.g., the browser window, is closed. This limitation has resulted in having to provide HTTP extensions for logging users into and out of web resources, e.g., by way of Common Gateway Interface (CGI) scripts, Java applets, etc.

This limitation may also preclude use of HTTP basic authentication in circumstances where a browser session cannot be closed. For example, terminals having a web browser embedded in Read Only Memory (ROM), or browsers that are integrated into an operating system, may lack a provision for being restarted, and therefore require rebooting or powering cycling to de-authenticate a browser's session.

BRIEF DESCRIPTION OF THE DRAWINGS

The features and advantages of the present invention will become apparent from the following detailed description of the present invention in which:

FIG. 2 illustrates a flowchart according to one embodiment for overcoming authentication for a generic authentication protocol.

FIG. 3 illustrates a flowchart, according to one embodiment, for overcoming authentication for the HTTP basic authentication protocol.

DETAILED DESCRIPTION

Figure 1A:
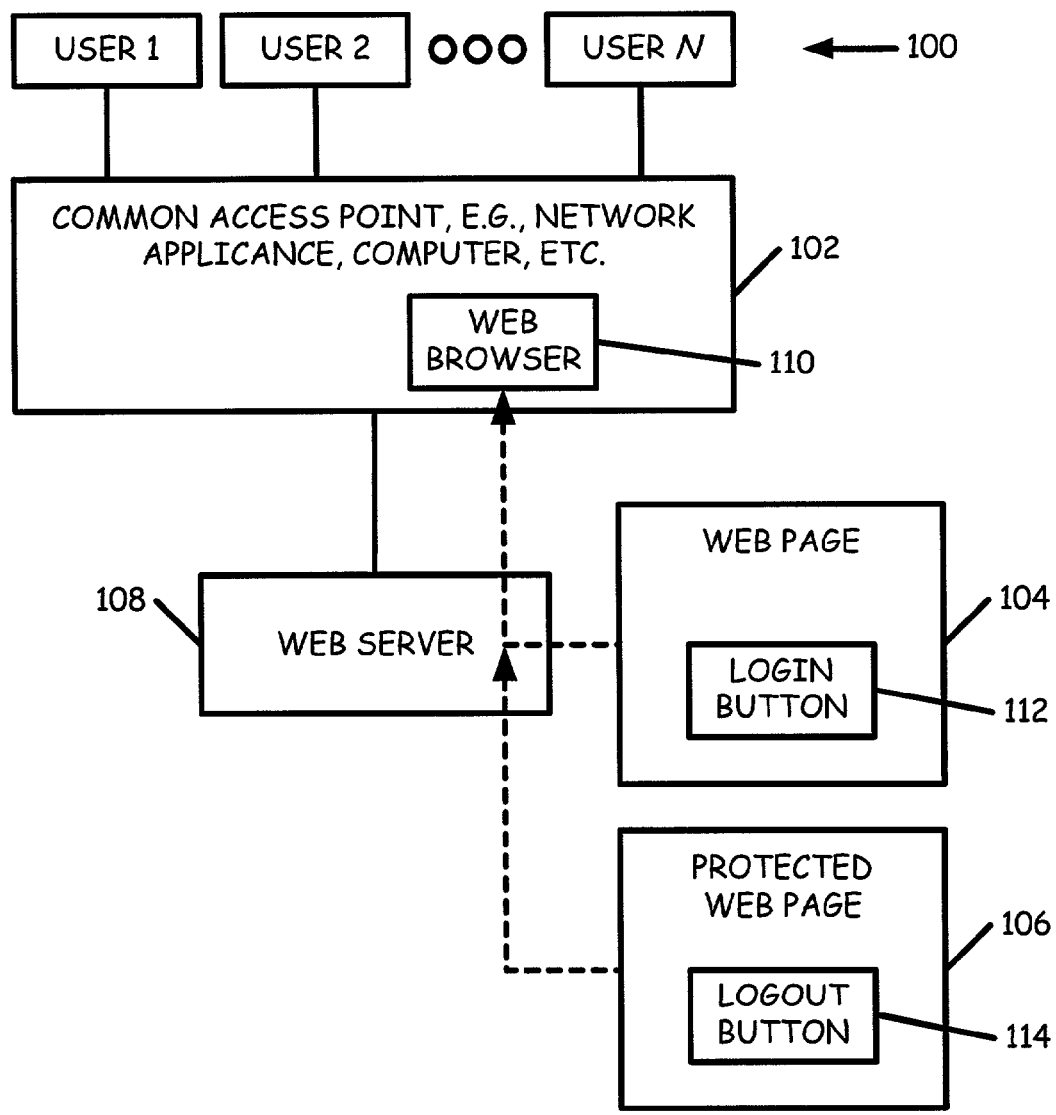
FIG. 1 and FIG. 2 illustrate a generalized computing environment in which multiple users use a common access point to access a web page.

FIG. 1A illustrates a generalized computing environment in which multiple users 100 use a common access point 102, such as a network appliance, computer, or other network access device, to access exemplary network resources 104, 106 provided by a server 108. In one embodiment, the web resources are two web pages, and the server a web server, however it will be appreciated that other network elements may be used.

Multiple users share the common access point. In one embodiment, a web browser 110 executes on the access point, and the browser is used by users 100 to access an initial web page 104. In the illustrated embodiment, the web page 104 comprises a login button 114 for authenticating user attempts to access a protected resource 106. It will be appreciated by one skilled in the art that other linking techniques may also be used, e.g., hyperlinks, etc. Assuming HTTP basic authentication protects access to the protected resource 106, selection of the button 112 triggers display of an HTTP basic authentication dialog box, see, e.g., FIG. 1B exemplary dialog box 150, to the user of the common access point 102.

When a user enters valid credentials into the authentication dialog 150, the web browser 110 loads the protected resource 106. As illustrated, the protected resource comprises a logout button 112 to de-authenticate the user. As discussed above, no such feature is presently available with HTTP basic authentication. However, as discussed below, multiple security realms can be used to implement de-authentication.

For example, one security realm can be associated with the protected resource 106, such that selecting the login button 112 allows a user 100 of the common access point 102 to be authenticated to that first security realm on providing proper credentials. Another security realm can be associated with the logout button 114, such that selecting the logout button causes the user to be transparently and automatically authenticated with the other security realm. As will be appreciated by one skilled in the art, under HTTP basic authentication, authentication with another security realm invalidates the first authentication. As will be more clear with reference to the FIG. 2 flowchart below, this invalidation effects a logout operation from the protected resource's security realm.

Figure 2:
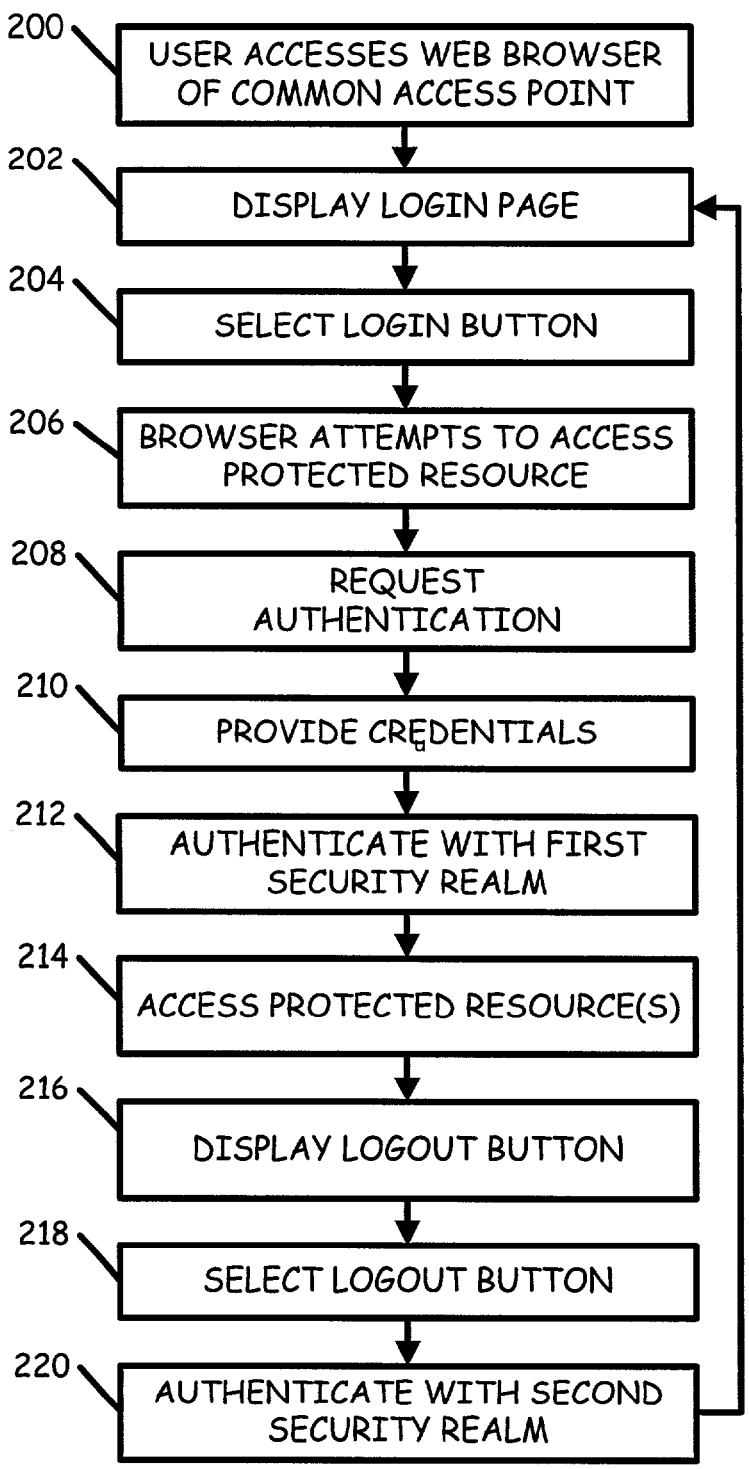

FIG. 2 is a flowchart generally illustrating the use of two security realms to effect a logout from HTTP basic authentication.

As illustrated, a user first accesses 200 a web browser or other network access program operating on a common access point. Assume the web browser defaults to displaying 202 a login page comprising a login button for accessing a protected resource. In the illustrated embodiment, the login page belongs in a first security realm that is generally accessible to all users of the common access point, e.g., the first security realm has no password protection, or has a public password (see, e.g., FIG. 3). The protected resource, however, belongs to a private second security realm, where non-public credentials (e.g., user names and/or password pairs) are required to access the protected resource.

Figure 1B:
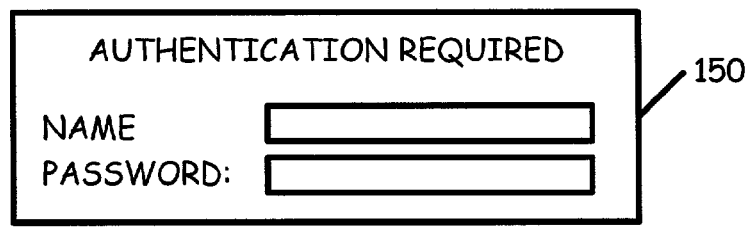

The user selects 204 the login button to access the protected resource of the second security realm. The protected resource is protected by HTTP basic authentication, e.g., by way of .htaccess/.htpasswd files, or another authentication system having comparable limitations of HTTP basic authentication. In one embodiment, selecting 204 the login button causes the browser to attempt to access 206 the protected resource. Then, due to the HTTP basic authentication protection, attempted access triggers a request 208 for authentication credentials, e.g., an authentication dialog box such as in FIG. 1B is provided to the user for filling out.

The user then provides 210 appropriate credentials within the authentication dialog box. Note that providing credentials depends on the nature of the authentication system employed. For example, FIG. 1B assumes HTTP basic authentication obtains credentials by way of entry into a conventional data entry dialog box. However, it will be appreciated that other authentication techniques may be employed. For example, authentication may include analysis of and/or comparisons between a user's biometric data, e.g., physical characteristics, fingerprints, retina patterns, body characteristics, voice analysis, etc.

Once appropriate credentials are provided, the user is authenticated 212 with the second security realm. The browser is then allowed to access 214 the protected resource of the second security realm. For example, if the protected resource is a web page, the user is allowed to interact with the protected web page. Note that many web pages, or other network resources, may be within the second security realm, allowing the user unrestricted access to these resources once initial authentication is completed.

Within a protected resource, a logout button is displayed 216. On selection 218 thereof by a user, the user is automatically authenticated 220 with a second security realm. As discussed above, HTTP basic authentication does not provide for de-authenticating from the second security realm. However, HTTP basic authentication only provides for one current security realm authentication. By authenticating with the first security realm, the user is de-authenticated from the second security realm. In such fashion, a single browser session of a common access point may be shared among multiple users, where each user may have their own credentials for accessing protected resources. When a user session is complete, a user may logout back to the login page 202 and leave the common access point ready for a subsequent user.

FIG. 3 illustrates an exemplary Common Gateway Interface (CGI) application 300 for de-authenticating a user from a second security realm by transparently redirecting the user to a login web page in the first security realm.

In this embodiment, the logout button of FIG. 1 and FIG. 2 is configured to cause a user's browser to load logout.cgi, a CGI application operating on the server hosting the protected resource. The illustrated CGI application is a Practical Extraction and Report Language (Perl) script that loads the resource of the first security realm. It will be appreciated that other script and non-script embodiments may perform the operations of the illustrated Perl script. In one embodiment, a user name and password is associated with the login page of the first security realm. Appropriate user name and password values are passed as parameters to the CGI application.

In one embodiment, the logout button is configured with a HyperText Transfer Protocol (HTTP) link to the logout.cgi resource, where the link includes authentication credentials as parameters to calling logout.cgi. As will be understood by one skilled in the art, the CGI application receives the user name and password parameters, and passes them on to the host server for validation. For example, if the server operates the Apache web server, then the credentials are compared against appropriate .htaccess/.htpasswd files.

In another embodiment, the first security realm can be server-side configured to not require passing of a user name or password, and therefore the login page can be simply loaded to effect authentication with the first security realm. In one embodiment, the user name for the first security realm (the main page for the public access point) must be assigned a globally unique name to ensure no inadvertent authentication into the second security realm.

Figure 4:
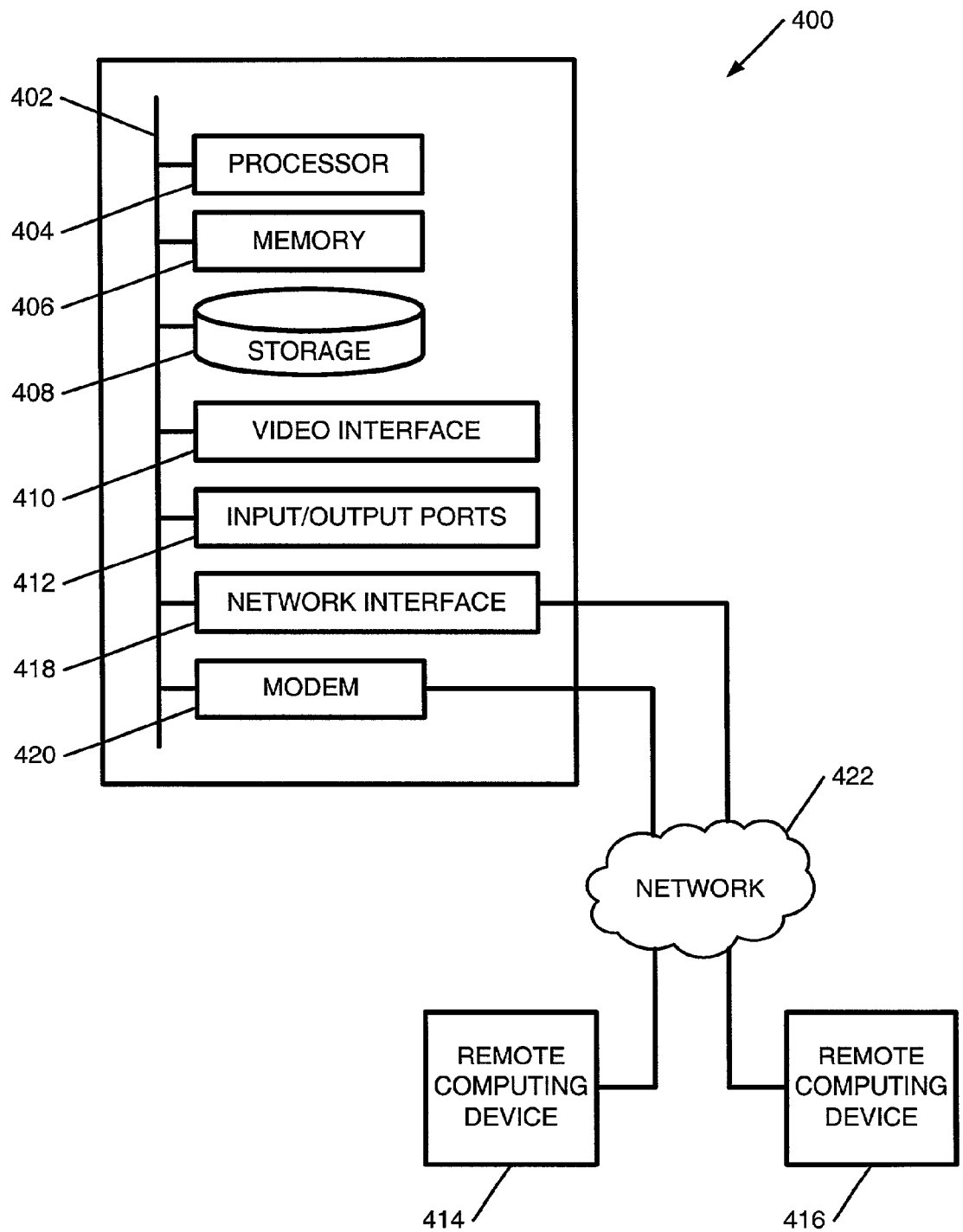
FIG. 4 illustrates a suitable computing environment in which certain aspects of the invention may be implemented.

FIG. 4 and the following discussion are intended to provide a brief, general description of a suitable computing environment in which certain aspects of the illustrated invention may be implemented. For example, an exemplary system for embodying the common access point 102 or web server 108 of FIG. 1 includes a machine 400 having system bus 402 for coupling various machine components.

Typically, attached to the bus are processors 404, a memory 406 (e.g., RAM, ROM), storage devices 408, a video interface 410, and input/output interface ports 412. The machine may also include embedded controllers, such as Programmable Logic Devices or Arrays (PLD, PLA), Generic or Programmable Array Logic (GAL, PAL), Field-Programmable Gate Arrays (FPGA), Application Specific Integrated Circuits (ASIC), single-chip computers, smart cards, etc.

The machine is expected to operate in a networked environment using logical connections to one or more remote machines 414, 416 through a network interface 418, modem 420, or other communication pathway. Machines may be interconnected by way of a wired or wireless network 422, including an intranet, the Internet, local area networks, wide area networks, cellular, cable, laser, satellite, microwave, Blue Tooth, optical, infrared, or other carrier technology.

The invention may be described by reference to program modules that may be stored in memory 406 and/or storage devices 408. Program modules include procedures, functions, programs, components, data structures, and the like, for performing particular tasks or implementing particular abstract data types. One skilled in the art will realize that program modules may be high-level programming language constructs, or low-level hardware instructions and/or contexts, and that they may be utilized in a compressed or encrypted format. Data may be stored in memory 406, storage devices 408, and associated media.

Program modules may be implemented within a single machine, or processed in a distributed network environment, and be stored in both local and remote memory. Memory and storage devices include hard-drives, floppy-disks, optical storage, magnetic cassettes, tapes, flash memory cards, memory sticks, digital video disks, biological storage, and the like, as well as wired and wireless transmission environments, such as network 422, over which program modules may be delivered in the form of packets, serial data, parallel data, or other suitable transmission format.

Thus, for example, with respect to the illustrated embodiments, assuming machine 400 operates as the common access point 102, then remote devices 414, 416 may other common access points or web servers. It will be appreciated that remote machines 414, 416 may be configured like machine 400, and therefore include many or all of the elements discussed for machine. It should also be appreciated that machines 400, 414, 416 may be embodied within a single device, or separate communicatively-coupled components.

Illustrated methods, and corresponding written descriptions thereof, are intended to illustrate machine-accessible media storing directives, or the like, which may be incorporated into single and multi-processor machines, portable computers, such as handheld devices including Personal Digital Assistants (PDAs), cellular telephones, and the like. Having described and illustrated the principles of the invention with reference to illustrated embodiments, it will be recognized that the illustrated embodiments can be modified in arrangement and detail without departing from such principles.

And, even though the foregoing discussion has focused on particular embodiments, it is understood that other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments, and unless implicitly or expressly indicated otherwise, embodiments are combinable into other embodiments. Consequently, in view of the wide variety of permutations to the above-described embodiments, the detailed description is intended to be illustrative only, and should not be taken as limiting the scope of the invention.

What is claimed as the invention, therefore, is all such modifications as may come within the scope and spirit of the following claims and equivalents thereto.

What is claimed is:

1. A method for de-authenticating from a first web server security realm protected by an authentication scheme lacking a de-authentication operation, the method comprising:
   attempting to access a first resource in a first security realm protected by the authentication scheme;
   receiving a request for authentication credentials in response to said attempting to access the first resource;
   supplying said authentication credentials in response to the request so as to become authenticated in the first security realm; and
   accessing a logout resource in the first security realm, said logout resource configured to automatically authenticate with a second security realm such that accessing the logout resource results in de-authentication from the first security realm.

2. The method of claim 1, further comprising:
   providing a common access point executing a web browser;
   first displaying a login web page of the second security realm so that a first user may authenticate with the first security realm and access the first resource, the login page comprising a login resource configured to perform said attempting to access the first resource; and
   second displaying the login web page of the second security realm responsive to said accessing the logout resource so that a second user may authenticate with the first security realm and access the first resource.

3. The method of claim 1, wherein the logout resource executes a script configured to authenticate a user with the second security realm.

4. The method of claim 3, wherein the logout resource comprises a web page element comprising a link to the script, and wherein the web page element incorporates authentication credentials for the second security realm so that the user need not provide authentication credentials to access the second security realm.

5. The method of claim 1, wherein the authentication scheme comprises HTTP basic authentication.

6. A method comprising:
   attempting to access a first resource in a first security realm protected by basic authentication;
   responsive to said attempting to access, receiving an authentication request for controlling access to the first resource;
   supplying authentication credentials responsive to said authentication request so as to authenticate with the first security realm;
   accessing a second resource in the first security realm; and
   responsive to said accessing the second resource, automatically authenticating with a second security realm and de-authenticating with the first security realm.

7. The method of claim 6, wherein HTTP basic authentication only provides for a single authentication so that said authenticating with the second security realm results in invalidation of said authentication with the first security realm.

8. The method of claim 7, further comprising:
   displaying a login element within a web browser, the login element configured to access the first resource upon activation thereof.

9. The method of claim 8, further comprising:
   displaying a logout element within the web browser for performing said automatically authenticating with the second security realm; and
   within a single browser session:
      authenticating a first user with the first security realm;
      authenticating the first user with the second security realm so as to de-authenticate the first user from the first security realm; and
      authenticating a second user with the first security realm.

10. An article of manufacture comprising a readable medium having instructions encoded thereon capable of directing a processor to perform:
    attempting to access a first resource in a first security realm protected by the authentication scheme;
    receiving a request for authentication credentials in response to said attempting to access the first resource;
    supplying said authentication credentials in response to the request so as to become authenticated in the first security realm; and
    accessing a logout resource in the first security realm, said logout resource configured to automatically authenticate with a second security realm on accessing thereof and to de-authenticate from the first security realm.

11. The article of manufacture of claim 10, said instructions comprising further instructions capable of directing the processor to perform:
    providing a common access point executing a web browser;
    first displaying a login web page of the second security realm so that a first user may authenticate with the first security realm and access the first resource, the login page comprising a login resource configured to perform said attempting to access the first resource; and
    second displaying the login web page of the second security realm responsive to said accessing the logout resource so that a second user may authenticate with the first security realm and access the first resource.

12. The article of manufacture of claim 10, wherein said instructions for said logout resource comprise instructions capable of directing the processor to execute a script configured to authenticate a user with the second security realm.

13. The article of manufacture of claim 12, further comprising:
said instructions for said logout resource further comprising instructions capable of directing the processor to provide a web page element comprising a link to the script; and
said instructions for said web page element further comprising instructions capable of directing the processor to provide authentication credentials for the second security realm so that the user need not provide authentication credentials to access the second security realm.

14. The article of manufacture of claim 10, wherein the authentication scheme comprises HTTP basic authentication.

15. An article of manufacture comprising a readable medium having instructions capable of directing a the processor to perform:
attempting to access a first resource in a first security realm protected by basic authentication;
responsive to said attempting to access, receiving an authentication request for controlling access to the first resource;
supplying authentication credentials responsive to said authentication request so as to authenticate with the first security realm;
accessing a second resource in the first security realm; and
responsive to said accessing the second resource, automatically authenticating with a second security realm and de-authenticating from the first security realm.

16. The article of manufacture of claim 15, wherein said instructions for authenticating with the second security realm invalidates a prior authentication with the first security realm.

17. The article of manufacture of claim 16, said instructions comprising further instructions capable of directing the processor to perform:
displaying a login element within a web browser, the login element configured to access the first resource upon activation thereof.

18. The article of manufacture of claim 17, said instructions comprising further instructions capable of directing the processor to perform:
displaying a logout element within the web browser for performing said automatically authenticating with the second security realm; and
within a single browser session:
authenticating a first user with the first security realm;
authenticating the first user with the second security realm so as to de-authenticate the first user from the first security realm; and
authenticating a second user with the first security realm.

19. An apparatus comprising:
means for attempting to access a first resource in a first security realm protected by the authentication scheme;
means for receiving a request for authentication credentials in response to said attempting to access the first resource;
means for supplying said authentication credentials in response to the request so as to become authenticated in the first security realm; and
means for accessing a logout resource in the first security realm, said logout resource configured to automatically authenticate with a second security realm such that accessing the logout resource results in de-authentication from the first security realm.

20. The apparatus of claim 19, further comprising:
means for providing a common access point executing a web browser;
means for first displaying a login web page of the second security realm so that a first user may authenticate with the first security realm and access the first resource, the login page comprising a login resource configured to perform said attempting to access the first resource; and
means for second displaying the login web page of the second security realm responsive to said accessing the logout resource so that a second user may authenticate with the first security realm and access the first resource.

21. An apparatus for de-authenticating from an HTTP basic authentication comprising:
means for attempting to access a first resource in a first security realm protected by HTTP basic authentication;
responsive to said attempting to access, means for receiving an authentication request for controlling access to the first resource;
means for supplying authentication credentials responsive to said authentication request so as to authenticate with the first security realm;
means for accessing a second resource in the first security realm; and
responsive to said accessing the second resource, means for automatically authenticating with a second security realm wherein said authentication results in automatically de-authenticating from the first security realm.

22. The apparatus of claim 21, further comprising:
means for displaying a logout element within the web browser for performing said automatically authenticating with the second security realm; and
within a single browser session:
means for authenticating a first user with the first security realm;
means for authenticating the first user with the second security realm so as to de-authenticate the first user from the first security realm; and
means for authenticating a second user with the first security realm.

23. A de-authentication method for a web browser, comprising:
accessing a first resource of a first security realm of the web server with the web browser, the web browser operable to automatically cache authentication credentials for a current security realm to which the web browser is authenticated;
receiving a request for authentication responsive to requesting the first resource;
authenticating with the first security realm based at least in part on providing authentication credentials responsive to the request for authentication, so that the current security realm is first security realm; and
de-authenticating from the first web server security realm based at least in part on accessing a second resource of a second security realm different from the first resource of the first security realm, so that the current security realm changes from the first security realm to the second security realm.

24. The method of claim 23, wherein the web browser and the web server communicate using a stateless communication protocol.

* * * * *